March 2, 1948.                    P. A. NOXON                    2,437,207
                                    CLUTCH
                              Filed Feb. 13, 1943

DEVELOPMENT OF CLUTCH FACE

INVENTOR
BY  Paul A. Noxon.
    ATTORNEY

Patented Mar. 2, 1948

2,437,207

UNITED STATES PATENT OFFICE 2,437,207

CLUTCH

Paul A. Noxon, Tenafly, N. J., assignor to Bendix Aviation Corporation, Bendix, N. J., a corporation of Delaware Application February 13, 1943, Serial No. 475,813

1 Claim. (Cl. 192—67)

This invention relates to clutches and more particularly to clutches adapted for rapid and positive engagement.

In high precision instruments such as, for example, automatic pilots for aircraft where, for manual control, a clutch is used for disconnecting a servomotor from a control surface, it is important that rapid and positive clutch engagement be obtained when the pilot changes over from manual control to control by the automatic pilot so as to preserve synchronism of the parts to prevent jolts, etc., which would otherwise occur if synchronism were not obtained when the automatic pilot is initially set in to control the craft. Clutches heretofore available have been of such a nature as to inject some time lag or slip between the driving and driven members and for this reason the rapid engagement desired and necessary for preserving synchronism of the controlling elements was unobtainable.

It is an object of the present invention, therefore, to provide a novel clutch adapted for rapid and positive engagement.

Another object of the invention is to provide a novel clutch, the driven member of which is so formed as to permit more rapid engagement of the driver member therewith than that heretofore obtainable.

A further object of the invention is to provide a novel clutch permitting rapid and positive engagement between its driving and driven members at relatively high speeds of rotation.

Another object of the present invention is to provide a novel clutch having a driven member formed with alternate high and low engaging surfaces for promoting substantially immediate engagement of the driver member therewith.

Another object of the invention is to provide a novel clutch, the driven member of which has formed thereon a series of receptive slots, the connecting surface between one slot and the next adjacent slot being in a plane lower than the plane of the connecting surface between the last-named slot and the next succeeding slot so that when the lugs on the driving member fall against the low surfaces they will travel toward the high surfaces which define abutments for the lugs forcing them to drop into their respective slots thereby insuring substantially immediate engagement therebetween.

A further object of the invention is to provide a novel clutch in which positive engagement will be obtained during a portion of a revolution of the driver member of the clutch.

The above and further objects and novel features of the invention will appear more fully from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is an exploded elevation view of the novel clutch of the present invention;

Figure 1:
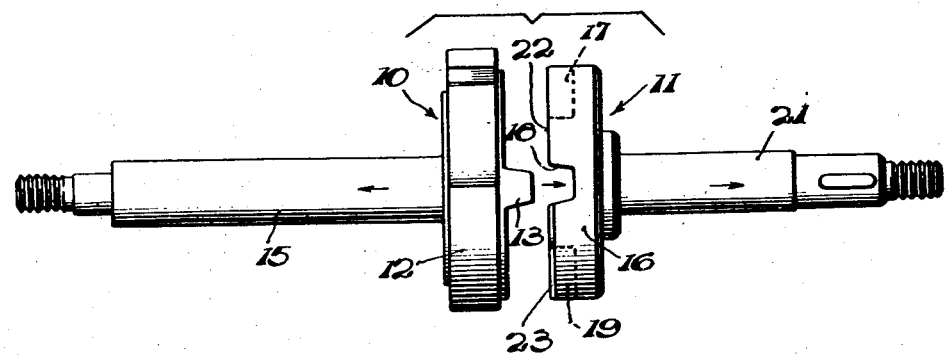
Figure 4:
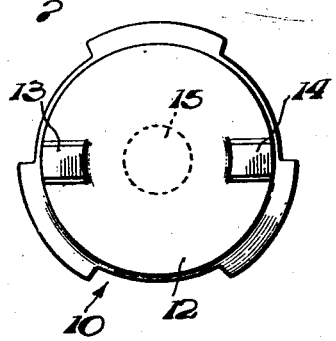
Figure 4 is an end elevation view of the driver member of the clutch.

The novel clutch of the present invention comprises a driver member 10 and a driven member 11, the former being preferably mounted for rotation as well as for longitudinal movement toward and away from the driven member and the latter being mounted for rotation only. The specific mounting, of itself, has not been shown as this is well known to the art. Furthermore, if so desired, driven member 11 may be mounted for longitudinal as well as rotatable movement in which case member 10 would be maintained against longitudinal movement.

The driver member is provided with a plate element 12 having a plane surface with a pair of diametrically opposed lugs 13 and 14 thereon of equal size and projection which may be either secured to or formed integrally with the plate member. A shaft 15 supports plate element 12 thereon in a suitable manner for transmitting motion from a prime mover (not shown) to the plate member.

Figure 2:
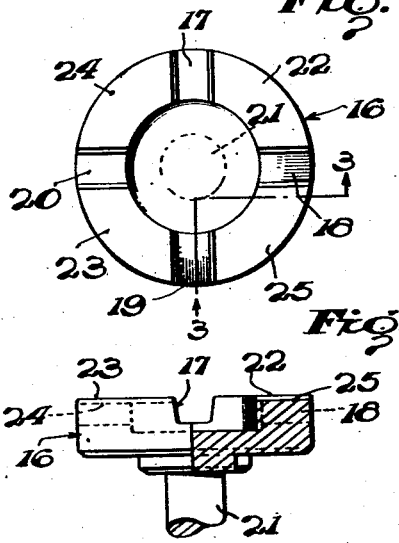
Figure 2 is an end elevation view of the driven member of the clutch of Figure 1.
Figure 3:
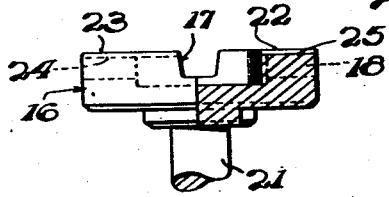
Figure 3 is a section view taken substantially along line 3—3 of Figure 2.

As better shown in Figure 2, the driven member comprises a plate element 16 having a plane surface with a series of slots 17, 18, 19 and 20 formed therein of the same size as the lugs and of a depth equal to the projection thereof, each slot being arranged at 90° with the next succeeding slot. With this arrangement, upon longitudinal movement of driver member 10, lugs 13 and 14 will be received by either of slots 17, 19 or 18, 20. Plate element 16 is suitably mounted upon a shaft 21.

Figure 5:
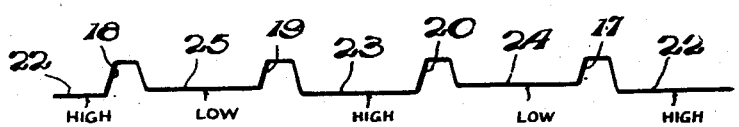
Figure 5 is a development view of the face of the driven member of Figure 2.

Figure 5 illustrates more clearly the novel arrangement of the driven member and, as there shown, alternate connecting surfaces 22 and 23 between slots 17, 18 and 19, 20 are continuously flat and in a somewhat raised plane from and parallel to the plane containing the likewise continuously flat surfaces 24 and 25 between slots 17, 20 and 18, 19 or the surfaces 24 and 25 are in a plane lower than the plane of the surfaces 22 and 23. Thus surface 22 connecting slot 17 with slot 18 is a high surface, surface 25 connecting slot 18 with slot 19 is a low surface, surface 23 connecting slot 19 with slot 20 is a high surface, and surface 24 connecting slot 20 with slot 17 is a low surface. It is thus seen that the engageable face of the driven member is provided with alternate high and low surfaces with slots or recesses all of equal depth between said surfaces.

The novel arrangement of the face of plate element 16 carries out the function of the present invention, that is, promotes rapid engagement between the driver and driven elements of the clutch. The foregoing function is accomplished by movement of plate element 12 toward plate element 16 at which time lug 13 of the former may engage low surface 24 of the latter while lug 14 will engage low surface 25. With a clockwise rotation of the driver, lug 13, if it does not fall into slot 17 will pass thereover and engage the raised edge of adjoining high surface 22 at the remote or far side of slot 17 which defines an abutment causing lug 13 to fall into and fit slot 17. This follows because longitudinal motion is likewise being applied to shaft 15. Lug 14, like lug 13, will pass over slot 19 to also engage and find an abutment in the raised edge of high surface 23 at the remote or far side of slot 19 and subsequently drop into and fit slot 19. Thus, engagement between the driver and driven members of the clutch is obtained almost immediately without any appreciable lag therebetween which would otherwise occur if all the connecting surfaces between the slots were in the same plane in which event the lugs would slide over the surfaces and slots for a considerable time or possibly one or more complete turns before positive engagement of the clutch.

If it should occur that upon initial longitudinal movement of plate element 12 toward plate 16, lugs 13 and 14 thereof engaged high surfaces 22 and 23, respectively, the lugs would probably pass over slots 18 and 20 and then engage low surfaces 25 and 24, respectively, in which event if the lugs do not enter slots 17, 19 they will then encounter abutments in the edges of high surfaces 22, 23 and fall into the latter slots 17, 19 in one direction of rotation or with the slots 18, 20 in the opposite direction of rotation, to thereby provide engagement of the clutch.

It will now become apparent to those skilled in the art that a novel clutch has been provided in which the driver element will engage the driven element in any relative position as opposed to clutches heretofore known in which engagement could be obtained in one relative position only. Furthermore, the novel clutch of the present invention will operate in either of two directions depending upon the direction of rotation of the driven element by the prime mover.

Although but a single embodiment of the present invention has been illustrated and described in detail, it is to be expressly understood that the invention is not limited thereto. Various changes can be made in the design and arrangement of parts without departing from the spirit and scope of the invention as will now be understood by those skilled in the art. For a definition of the limits of the invention, reference will be had primarily to the appended claim.

I claim:

A clutch comprising driving and driven members having coengaging faces perpendicular to their axes and parallel to each other, one of said members being provided with a pair of diametrically arranged lugs of equal size projecting axially from its face and the other of said members being formed with a plurality of receptive slots in its face of equal size with the lugs and constituting a multiple of the number of lugs, with pairs arranged in diametrically opposed relation, the connecting surfaces between alternate pairs of slots being continuously flat and of equal length but longer than the lugs with alternate surfaces arranged in high and low planes respectively, whereby when the members are moved toward and rotated relative to each other, the lugs will engage and move over the low surfaces and slots at the ends thereof until they engage the adjacent ends of the high surfaces at the remote sides of said slots to cause interfitting engagement of the lugs with the slots, the bottoms of said slots being in a common plane spaced from but parallel to the planes of the connecting surfaces.

PAUL A. NOXON.

REFERENCES CITED

The following references are of record in the file of this patent:

UNITED STATES PATENTS

| Number | Name | Date |
|---|---|---|
| 449,065 | Bennett | Mar. 24, 1891 |
| 732,943 | Jenatzy | July 7, 1903 |
| 831,433 | Hendrickson | Sept. 18, 1906 |

FOREIGN PATENTS

| Number | Country | Date |
|---|---|---|
| 29,208 | Sweden | Jan. 19, 1909 |
| 82,113 | Switzerland | Jan. 16, 1920 |
| 95,943 | Switzerland | Aug. 16, 1922 |